United States Patent Office 3,369,116
Patented Feb. 13, 1968

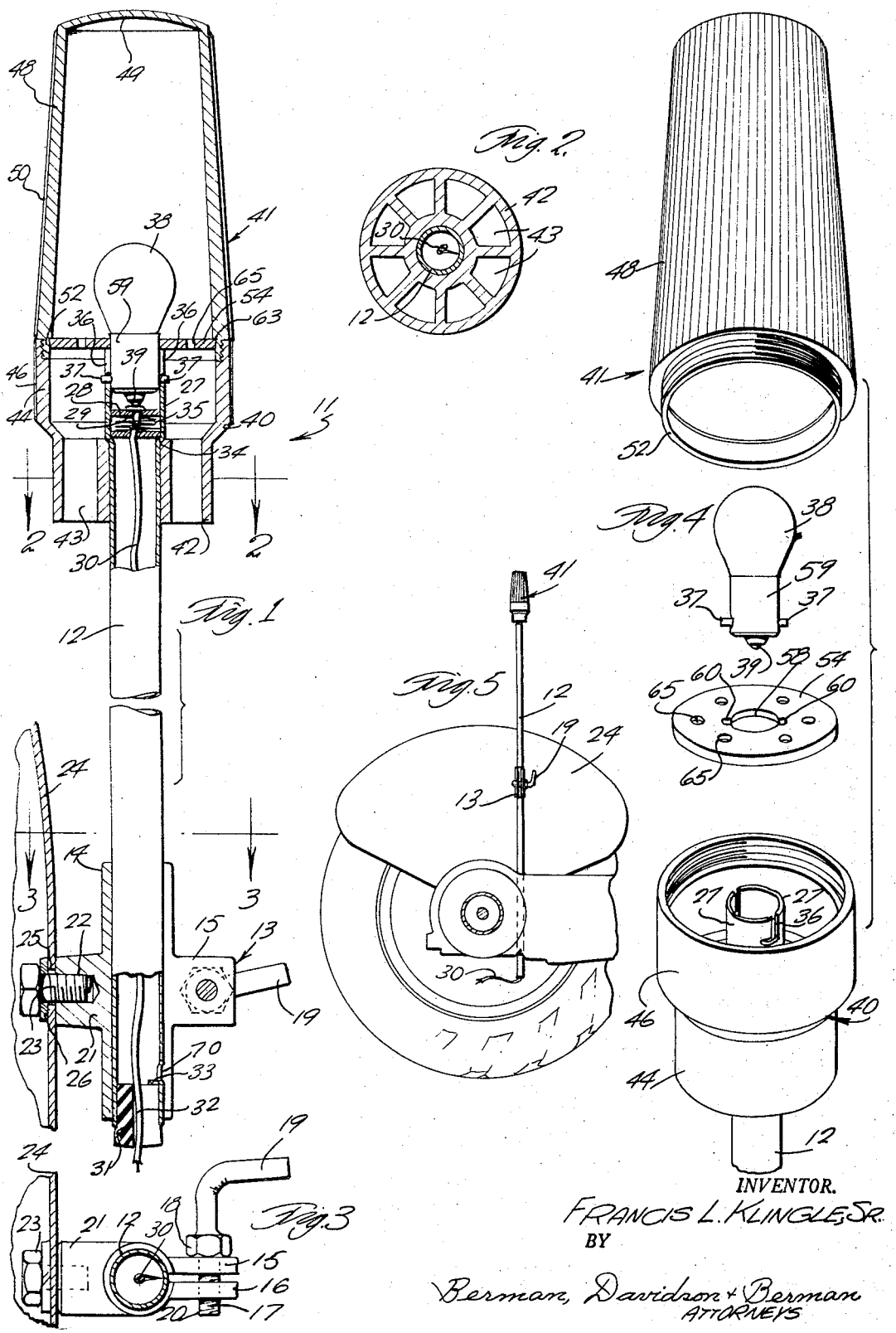

3,369,116
TRACTOR LIGHT
Francis L. Klingle, Sr., % Modern Manufacturing Co.,
Box 42, Cresco, Iowa 52136
Filed Oct. 19, 1965, Ser. No. 497,916
5 Claims. (Cl. 240—8.1)

ABSTRACT OF THE DISCLOSURE

A tractor safety warning light assembly consisting of a hollow post provided at its lower end with a bracket for adjustable pivotal attachment to the side of a tractor fender. A lamp socket is provided at the top end of the post. A lamp is mounted in the socket. The ventilated bottom portion of a translucent lamp globe is slidably-mounted on the post below the socket. Said bottom portion carries a band of reflective material. A colored translucent dome element is threadedly-engaged with the top rim of said bottom portion. An apertured protective disc surrounds the base of the lamp, being supported on the rim of the lamp socket, and fits slidably in the lower rim of the dome element, being engaged by a downwardly-facing shoulder provided in said lower rim.

---

This invention relates to vehicle safety devices, and more particularly to warning or safety lights for tractors or other slow moving vehicles.

The main object of the invention is to provide a novel and improved safety or warning light for slow moving vehicles, such as tractors, or the like, the light being simple in construction, being easy to install on a vehicle, being readily adjustable in height, and being highly visible so that it can be readily seen on a highway or other vehicle thoroughfare.

A further object of the invention is to provide an improved safety lamp assembly for a tractor or similar slow moving vehicle, the assembly involving relatively few parts, being inexpensive to manufacture, being very durable in construction, and being neat in appearance.

A still further object of the invention is to provide an improved safety lamp assembly for a tractor or similar vehicle, the assembly providing a readily visible indication of the position of the tractor on which it is mounted, so that it warns operators of faster moving vehicles of the presence of the tractor or other vehicle carrying the safety lamp assembly, the assembly being highly resistant to adverse weather conditions, and requiring a minimum amount of maintenance.

Further objects and advantages of the invention will become apparent from the following description and claims and from the accompanying drawings, wherein:

FIGURE 1 is a fragmentary vertical cross-sectional view taken through an improved safety lamp assembly according to the present invention, shown mounted on the fender of a tractor.

FIGURE 2 is a horizontal cross-sectional view taken substantially on the line 2—2 of FIGURE 1.

FIGURE 3 is a horizontal cross-sectional view taken substantially on the line 3—3 of FIGURE 1.

FIGURE 4 is a perspective view of the upper portion of the assembly of FIGURE 1, with the parts shown in separated positions.

FIGURE 5 is a fragmentary longitudinal vertical cross-sectional view taken through a portion of a tractor showing an improved safety lamp assembly such as that illustrated in FIGURES 1 to 4, mounted on the fender of a tractor.

Referring to the drawings, 11 generally designates an improved warning and safety lamp assembly constructed in accordance with the present invention. The assembly 11 comprises a tubular post member 12 which may be of suitable corrosion-resistant metal tubing, such as zinc-plated steel tubing. The tubular post member 12 is received in a mounting bracket 13 comprising a split sleeve portion 14 having the outwardly extending opposing clamping lugs 15 and 16. A clamping screw 17 is threadedly engaged through the lug 16, the clamping screw being provided with a flange or nut portion 18 rigidly secured thereto which bears against the lug 15, as shown in FIGURE 3, whereby tightening of the screw 17 forces lug 15 toward lug 16 and thus contracts the split sleeve 14 on the tube 12, thus clamping the tube in the sleeve. The screw 17 is provided with the outwardly projecting handle portion 19 to facilitate the manual rotation of the screw, the threaded end portion of the screw being upset, as shown at 20 to prevent the removal of the screw from the lug 16.

The clamping sleeve 14 is integrally formed at its intermediate portion with a boss or projection 21 which is in turn formed with a tapped bore 22. A fastening bolt 23 is threadedly engageable in the tapped bore 22 in the manner illustrated in FIGURE 1, for clampingly securing the bracket 13 to the fender 24 or any other suitable wall surface of a tractor or similar slow moving vehicle on which the warning or safety lamp assembly 11 is to be mounted. Thus, the bolt 23 is engaged through an aperture 25 in the tractor fender 24, the head of the bolt bearing against a suitable lock washer 26 interposed between the bolt head and the fender 24. With the bolt 23 tightened the bracket 13 will be rigidly secured in a vertical or inclined position, as desired. Thus, with the bracket 13 secured in the manner illustrated in FIGURE 1, the split sleeve 14 is vertical, holding the post 12 vertical.

The top end portion of the post member 12 is slightly enlarged, as shown at 27, to define a receptacle for a lamp socket disc 28 of insulating material slidably received therein, the socket disc 28 having a lamp center contact element 29 centrally secured therein. A suitably insulated feed wire 30 is connected to the center contact 29, the wire 30 extending downwardly through the post 12 and through a bottom rubber plug 31 provided in the bottom end of the post member 12, the plug 31 having a radial slot 32 through which the insulated feed wire 30 passes, as shown in FIGURE 1. The tubular post 12 is provided with an inturned stop lug 33 immediately above the plug 31 to limit the upward movement of the plug 31 in the tube, as shown.

The feed wire 30 also passes through a disc 34 of suitable insulating material disposed in the enlarged top portion 27 of the socket and bearing on the annular shoulder defined at the bottom end of said enlarged portion 27. A coil spring 35 is provided in the space between the discs 28 and 34, bearing between said discs, and biasing disc 28 upwardly. The socket portion 27 is formed with diametrically opposed L-shaped slots 36, 36 adapted to lockingly receive the opposing locking pins 37, 37 of the base 59 of a conventional incandescent lamp 38, whereby to secure the lamp with its center contact 39 in engagement with the socket center contact element 29, as shown.

Slidably mounted on the post member 12 below the enlarged socket portion 27 thereof is the bottom member 40 of a translucent plastic lamp globe or dome assembly 41. The bottom member 40, as well as the other parts of the assembly 41, are made of transparent plastic material, the bottom member 40 being preferably of clear transparent material. Member 40 comprises a main body portion 42 which is generally cylindrical in shape and which is formed with a plurality of vertical ventilating passages 43 circularly arranged around the central portion of body 42. The upper portion of body 42 is somewhat enlarged in diameter and comprises the cylindrical shell portion 44 which is of annular shape and which is outwardly offset from the main body portion 42, as shown in FIGURE 1. The enlarged top portion 44 of member 40 is preferably provided with a band 46 of suitably colored reflective material, such as red-tinted reflective material identified by the trade name "Scotchlite."

Threadedly secured on the enlarged annular upper portion 44 of member 40 is a dome element 48 of suitably colored transparent plastic material, such as amber-tinted plastic material which is relatively clear. The dome 48 tapers upwardly in diameter and has the generally spherically-curved top wall 49, the side wall of the dome being integrally formed with outwardly projecting serrations or ribs 50. The bottom rim of the dome 48 comprises the inwardly offset externally threaded depending rim flange 52 which is threadedly-engaged in the top rim of upper portion 44 of member 40.

Surrounding the base of the lamp 38 is a protective disc 54 of transparent plastic or other suitable material which is formed with a central aperture 58 receiving the lamp base 59, the disc 54 being mounted so as to be supported on the top rim of socket portion 27 of the post member 12. Thus, the disc 54 is provided with diametrically opposed notches 60, 60 in its central aperture to provide clearance for the lamp base pins 37, 37. The disc fits slidably in the depending rim 52 and is engageable by the inwardly facing annular shoulder 63 defined above the depending rim 52. The disc 54 is formed with a plurality of circularly arranged ventilation holes 65 arranged on a circle concentric with the central aperture 58.

As above explained, the post member 12 may be mounted in the bracket 13, said bracket being secured to a tractor fender 24, or other convenient portion of the body of the tractor or other slow moving vehicle with which the device is to be used. Post member 12 may be adjusted in height by loosening the screw 17, whereby to allow the post member to slide through the sleeve portion 14 of the bracket 13 to its desired position, after which the clamping screw 17 may be retightened. The bracket 13 may be pivotally adjusted on the fender 24 and locked in angularly adjusted position by means of the clamping bolt 23.

The feed wire 30 is connected in any suitable manner to the ungrounded terminal of the vehicle battery, for example, though a control switch, or through a conventional flasher switch, as desired. Thus, the clamp 38 may be either continuously energized or may be repetitively flashed on and off so that it serves as a blinker light. As shown in FIGURE 5, the post member 12 may be adjusted to a position wherein the dome assembly 41 is located at a considerable height above the fender 24 of the vehicle, so that it is easily visible to the operators of faster-moving vehicles. The assembly thus provides a highly visible warning indication of the presence of the slower moving vehicle on which it is mounted.

The inturned stop lug 33 which serves to limit the upward movement of the rubber plug 31 is punched inwardly whereby to define a drainage aperture 70 in the lower portion of the post member 12, thus allowing moisture to drain freely from the post member if it should form therein.

It will be noted that the assembly not only serves as a warning light to indicate the presence of the associated slow-moving vehicle, but also serves to illuminate said vehicle to some extent, since light is transmitted downwardly through the transparent support disc 54 and the transparent bottom portion 40 of the dome assembly, whereby the associated vehicle is illuminated to some extent. Thus, not only is a warning provided of the presence of the vehicle, but also the vehicle is illuminated sufficiently so that operators of approaching vehicles can determine the nature of the vehicle carrying the warning lamp assembly.

While a specific embodiment of an improved safety or warning light for a tractor or similar slow-moving vehicle has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A warning lamp assembly comprising a bracket, means to secure said bracket to a portion of a vehicle, said bracket being provided with a clamping sleeve, a tubular post member adjustably-mounted in said clamping sleeve, a lamp socket integrally-formed as an enlargement of the top end of said post member, lamp-contact means in said socket, a lamp mounted in the socket and having a base portion provided with terminal means engaged with said lamp-contact means, a transparent dome assembly secured on the top end of the post member and surrounding said lamp, and an apertured transparent support disc surrounding the base portion of the lamp, said support disc being supported on the top end of said lamp socket.

2. The warning lamp assembly of claim 1, and downwardly facing annular shoulder means in the dome assembly engaging the peripheral portion of said apertured support disc.

3. The warning lamp assembly of claim 2, and wherein said dome assembly comprises a base portion slidably secured on the post member subjacent said socket and a removable transparent colored top portion threadedly secured to said base portion.

4. The warning lamp assembly of claim 3, and a depending rim element on said transparent colored top portion, said support disc being slidably received inside said depending rim element, said downwardly facing shoulder means being located inwardly adjacent said rim element.

5. The warning lamp assembly of claim 4, and wherein said base portion is provided with a plurality of substantially vertical ventilation apertures.

References Cited

UNITED STATES PATENTS

| 1,569,041 | 1/1926 | Shay | 240—8.18 |
| 2,050,981 | 8/1936 | Cohen | 240—8.1 |
| 2,753,439 | 7/1956 | Greenfield | 240—8.1 |
| 2,996,607 | 8/1961 | Witt | 240—7.1 |
| 3,287,549 | 11/1966 | Lantery | 240—8.1 |

NORTON ANSHER, *Primary Examiner.*